(12) United States Patent
Vongkulbhisal

(10) Patent No.: US 11,594,059 B2
(45) Date of Patent: Feb. 28, 2023

(54) IDENTIFYING LAST PERSON IN QUEUE

(71) Applicant: INTERNATIONAL BUSINESS MACHINES CORPORATION, Armonk, NY (US)

(72) Inventor: Jayakorn Vongkulbhisal, Tokyo (JP)

(73) Assignee: International Business Machines Corporation, Armonk, NY (US)

(*) Notice: Subject to any disclaimer, the term of this patent is extended or adjusted under 35 U.S.C. 154(b) by 123 days.

(21) Appl. No.: 17/201,001

(22) Filed: Mar. 15, 2021

(65) Prior Publication Data

US 2022/0292282 A1  Sep. 15, 2022

(51) Int. Cl.
*G06V 20/52* (2022.01)
*G06V 40/10* (2022.01)
*G06T 7/70* (2017.01)

(52) U.S. Cl.
CPC ............... *G06V 40/10* (2022.01); *G06T 7/70* (2017.01); *G06V 20/53* (2022.01); *G06T 2207/30196* (2013.01)

(58) Field of Classification Search
CPC .......... G06V 40/10; G06V 20/53; G06T 7/70; G06T 2207/30196
See application file for complete search history.

(56) References Cited

U.S. PATENT DOCUMENTS

| | | |
|---|---|---|
| 5,953,055 A | 9/1999 | Huang et al. |
| 8,855,364 B2 | 10/2014 | Loos et al. |
| 9,582,762 B1 | 2/2017 | Cosic |
| 9,767,365 B2 | 9/2017 | Robinson |
| 10,423,838 B2 | 9/2019 | Gyger et al. |
| 10,509,969 B2 | 12/2019 | To et al. |
| 11,438,329 B2 * | 9/2022 | Hart ..................... H04L 67/146 |
| 2004/0143602 A1 | 7/2004 | Ruiz |

(Continued)

FOREIGN PATENT DOCUMENTS

| | | | |
|---|---|---|---|
| CN | 110175528 A | 8/2019 | |
| EP | 3044760 B1 * | 9/2020 | ......... G06K 9/00778 |

(Continued)

OTHER PUBLICATIONS

Bianchini et al., "Recursive neural networks for processing graphs with labelled edges: theory and applications", Elsevier, Neural Networks, 19 (2005), pp. 1040-1050.

(Continued)

*Primary Examiner* — Shaghayegh Azima
(74) *Attorney, Agent, or Firm* — Teddi E. Maranzano

(57) ABSTRACT

A method, a computer program product, and a computer system identifies a last person of a queue. The method includes receiving an image of the queue where the image includes a plurality of individuals comprising the queue. The method includes determining positions and facing directions of the individuals comprising the queue. The method includes identifying the last person of the queue based on a vector field analysis according to the positions and the facing directions of the individuals comprising the queue. The method includes generating instructions to join the queue based on the identified last person of the queue. The instructions include a modified image indicating the last person of the queue in the image.

14 Claims, 5 Drawing Sheets

(56) References Cited

U.S. PATENT DOCUMENTS

| | | | |
|---|---|---|---|
| 2008/0050039 A1* | 2/2008 | Jin | H04N 1/00132 707/E17.031 |
| 2012/0207350 A1 | 8/2012 | Loos | |
| 2014/0270707 A1* | 9/2014 | Fathi | G06V 40/20 386/278 |
| 2015/0213702 A1 | 7/2015 | Kimmel | |
| 2016/0224844 A1 | 8/2016 | Gyger | |
| 2016/0224845 A1* | 8/2016 | Gyger | G06V 20/53 |
| 2016/0292514 A1 | 10/2016 | Robinson | |
| 2019/0080178 A1 | 3/2019 | To | |
| 2020/0051270 A1* | 2/2020 | Liu | G06T 7/20 |
| 2020/0111031 A1 | 4/2020 | Wakim | |
| 2021/0400433 A1* | 12/2021 | Igarashi | G06Q 50/10 |
| 2022/0283590 A1* | 9/2022 | Deyle | G05D 1/0274 |

FOREIGN PATENT DOCUMENTS

| | | | |
|---|---|---|---|
| GB | 2505501 B | | 9/2020 |
| JP | 2020086772 A | * | 6/2020 |

OTHER PUBLICATIONS

Choi et al., "Discovering Groups of People in Images", ECCV 2014, pp. 1-26.

Del Pizzo et al., "Counting people by RGB or depth overhead cameras", Elsevier, Pattern Recognition Letters 81, Jun. 2016, pp. 41-50.

Kahn, "Multi-person tracking based on Faster R-CNN and Deep Appearance Features", available at http://www.intertechopen.com/online-first/multi-person-tracking-based-on-faster r-cnn-and-deep-appearance-features, May 2019, pp. 1-21.

Kim et al., "Edge-Labeling Graph Neural Network for Few-Shot Learning", CVPR 2019, May 2019, pp. 1-10.

Mell et al., "The NIST Definition of Cloud Computing", National Institute of Standards and Technology, Special Publication 800-145, Sep. 2011, pp. 1-7.

Pending U.S. Appl. No. 16/786,628, filed Feb. 10, 2020, entitled: "Semi-Supervised Grouping and Classifying Groups From Images", pp. 1-34.

* cited by examiner

IDENTIFYING LAST PERSON IN QUEUE

BACKGROUND

The exemplary embodiments relate generally to queues, and more particularly to processing individuals lined up in a queue to identify a last person standing in a given queue.

A queue may form when a surplus of individuals arrives at a destination within a period of time that does not allow at least a portion of the surplus of individuals from being serviced. As more individuals comprise the surplus, a length of the queue may increase. As a queue grows in length, new arrivals at the destination may be unfamiliar with where the queue begins and where the queue ends, particularly when the queue is formed in an illogical manner at first glance. As forming and joining a queue is a relatively important social behavior, identifying the last person in the queue is necessary for various applications that require following social norms such as guiding applications for sight impaired individuals to join the queue after the current last person in the queue. A new arrival utilizing a map application may also arrive at the destination only to be met by the queue where the last person in the queue may be a significant distance away from the destination.

SUMMARY

The exemplary embodiments disclose a method, a computer program product, and a computer system for identifying a last person of a queue. The method comprises receiving an image of the queue where the image includes a plurality of individuals comprising the queue. The method comprises determining positions and facing directions of the individuals comprising the queue. The method comprises identifying the last person of the queue based on a vector field analysis according to the positions and the facing directions of the individuals comprising the queue. The method comprises generating instructions to join the queue based on the identified last person of the queue. The instructions include a modified image indicating the last person of the queue in the image.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Figure 1:
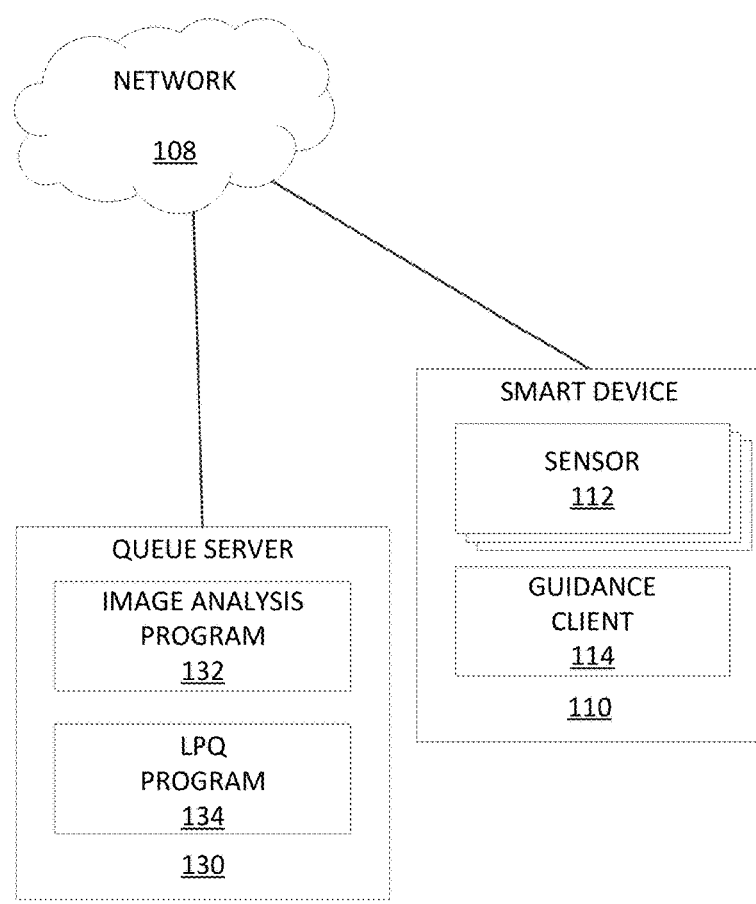
FIG. 1 depicts an exemplary schematic diagram of a queue guidance system 100, in accordance with the exemplary embodiments.

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

The exemplary embodiments are directed to a method, computer program product, and system for identifying a last person of a queue (LPQ) and determine a manner of joining the queue for a new arrival to the queue. The exemplary embodiments provide a mechanism in which a user who wishes to join the queue provides an image of a queue for the mechanism to determine a direction of the queue and the LPQ. As will be described in further detail below, the exemplary embodiments may identify a flow of the queue through directionality of the individuals comprising the queue and glide backward to identify the LPQ. In identifying the LPQ, the exemplary embodiments may also determine and provide instruction to the user as to the proper manner of joining the queue. Key benefits of the exemplary embodiments may include providing appropriate instruction to join queues for new arrivals to the queue according to acceptable social norms. Detailed implementation of the exemplary embodiments follows.

Although a simple concept, a queue may introduce various complications as there may be many different factors that complicate matters. For example, a number of people in the queue may increase a length of the queue. When arriving at the queue in a middle section or a non-end portion, a new arrival may be unsure as to which end is the front and which end is the back. In another example, the individuals in the queue may not be standing in a uniform direction. When a group of individuals join a queue together, they may turn to speak to other members of the group standing in the queue. With multiple directionalities, a new arrival to the queue may again be unsure as to which end is the front and which end is the back. In a further example, the queue may exhibit a non-linear path. During rush hour, a public transportation center such as a bus terminal may service multiple bus lines where queues form and wrap around various structures. A new arrival to the public transportation center may be unsure which queue to join. Even if the correct queue is identified, the new arrival may still not know how to properly join the queue. There may be still further complications that may arise with queues such as improper spacing that creates a gap in the queue large enough to appear to be an end of the queue. For example, there may be a gap in a mid-section to allow pedestrian traffic to pass but an individual of the queue in that position does not represent the LPQ).

In processing characteristics of a queue (e.g., using an image capturing the queue), training data may be difficult to gather for an application to properly identify a LPQ of a particular queue under conditions that are specific to that queue. For example, there is no existing dataset for human queues and LPQ from first-person images relative to a new arrival. In another example, with increases in privacy issues, privacy concerns make gathering such datasets more challenging.

Conventional approaches have provided a variety of mechanisms to process characteristics involving a gathering of individuals. For example, a conventional approach may provide a semi-supervised method to group and classify groups of people based on images such as red-green-blue (RGB) images. The conventional approach may cluster people in the RGB images into groups to determine how individuals in each group may be associated with one another. However, this conventional approach only determines various groupings without determining any particular characteristic of a group (e.g., such as a LPQ). In another example, a conventional approach may identify a queue via a video capturing the dynamics of the queue over time. However, to identify the LPQ, the conventional approach requires detecting the last person entering the queue at the end. Without this knowledge, the conventional approach is not configured to determine the LPQ. In a further example, a conventional approach may list the individuals in a queue from front to back. However, to list these individuals, the conventional approach requires an initial input of a point of interest, namely the point of interest indicative of the front of the queue. Without this knowledge, the conventional approach is not configured to determine the LPQ.

The exemplary embodiments are configured to detect a LPQ from first-person images that capture the image utilizing an unsupervised method where training data is not required. Based on information ascertained from the image, the exemplary embodiments may extrapolate various types of information. The exemplary embodiments may incorporate assumptions having a high truth probability such as individuals of a queue generally facing towards the head/front of the queue or a point of interest indicative of the head/front of the queue (e.g., service counter, bathroom entrance, etc.). By combining the information from the images and the base assumptions, the exemplary embodiments may identify a flow of the queue and glide backward to identify the LPQ. The exemplary embodiments may determine a perspective of the first-person image to also determine a general position relative to the queue and the LPQ and provide instructions to join the queue. In this manner, the exemplary embodiments identify the LPQ in an ad hoc approach that is unsupervised and requires no training data.

FIG. 1 depicts a queue guidance system 100, in accordance with the exemplary embodiments. According to the exemplary embodiments, the queue guidance system 100 may include a smart device 110 and a queue server 130, which may be interconnected via a network 108. While programming and data of the exemplary embodiments may be stored and accessed remotely across several servers via the network 108, programming and data of the exemplary embodiments may alternatively or additionally be stored locally on as few as one physical computing device or amongst other computing devices than those depicted.

In the exemplary embodiments, the network 108 may be a communication channel capable of transferring data between connected devices. Accordingly, the components of the queue guidance system 100 may represent network components or network devices interconnected via the network 108. In the exemplary embodiments, the network 108 may be the Internet, representing a worldwide collection of networks and gateways to support communications between devices connected to the Internet. Moreover, the network 108 may utilize various types of connections such as wired, wireless, fiber optic, etc. which may be implemented as an intranet network, a local area network (LAN), a wide area network (WAN), or a combination thereof. In further embodiments, the network 108 may be a Bluetooth network, a WiFi network, or a combination thereof. In yet further embodiments, the network 108 may be a telecommunications network used to facilitate telephone calls between two or more parties comprising a landline network, a wireless network, a closed network, a satellite network, or a combination thereof. In general, the network 108 may represent any combination of connections and protocols that will support communications between connected devices. For example, the network 108 may also represent direct or indirect wired or wireless connections between the components of the queue guidance system 100 that do not utilize the network 108.

In the exemplary embodiments, the smart device 110 may include one or more sensors 112 and a guidance client 114, and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an Internet of Things (IoT) device, or any other electronic device or computing system capable of receiving and sending data to and from other computing devices. While the smart device 110 is shown as a single device, in other embodiments, the smart device 110 may be comprised of a cluster or plurality of computing devices, in a modular manner, etc., working together or working independently. The smart device 110 is described in greater detail as a hardware implementation with reference to FIG. 3 (e.g., data processing according to the exemplary embodiments being performed by processor 02), as part of a cloud implementation with reference to FIG. 4 (e.g., the smart device 110 according to the exemplary embodiments being represented by the cellular telephone 54A), and/or utilizing functional abstraction layers for processing with reference to FIG. 5 (e.g., workload layer 90 including queue processing 96 according to the exemplary embodiments). For illustrative purposes, the smart device 110 may be utilized by a user who is a new arrival to a queue and interested in joining the queue.

In the exemplary embodiments, the one or more sensors 112 may generate various types of information associated with a user utilizing the smart device 110. For example, the sensors 112 may include an imager such as a camera. The imager may generate an image of a queue. With the imager incorporated in the smart device 110, the user may utilize the imager to capture the image of the queue from a first-person perspective. However, the imager may be incorporated into other devices (e.g., a drone, a selfie stick, etc.) that may capture the image of the queue from other angles (e.g., a downward facing angle). In another example, the sensors 112 may include positioning components that are configured to determine a location of the user (e.g., global positioning system, triangulation system, etc.). As will be described in further detail below, the exemplary embodiments may utilize a location of the user relative to the queue to determine the specific instructions to be provided to the user to join the queue. The exemplary embodiments may utilize any available data to determine the location of the user such as the images captured by the imager, the positioning components of the sensors 112, etc.

In the exemplary embodiments, the guidance client 114 may act as a client in a client-server relationship and may be a software, hardware, and/or firmware based application capable of exchanging data including the image and guidance information via the network 108. In embodiments, the guidance client 114 may provide a user interface in which an image may be selected and instructions may be viewed as well as interact with one or more components of the queue guidance system 100, and utilize various wired and/or wireless connection protocols for data transmission and exchange associated with data used for modifying a version of an application, including Bluetooth, 2.4 gHz and 5 gHz internet, near-field communication, Z-Wave, Zigbee, etc.

The guidance client 114 may show an image of a queue as captured by the user. As an image may not include the entire queue, may not include at least an end to the queue, may not capture the queue properly, may have image clarity issues, etc., the guidance client 114 may show the image to the user to confirm whether the selected image is to be used for purposes of the exemplary embodiments. Upon selecting the image of the queue, the features of the exemplary embodiments may be performed and return instructions that are provided to the user.

As noted above, the guidance client 114 may include a user interface that shows instructions to be followed by the user to join the queue following social norms and etiquette. That is, the instructions provide guidelines for the user to join the end of the queue after a current LPQ. In an exemplary embodiment, based on the information indicative of the LPQ, the guidance client 114 may show the same image from which the LPQ was determined. Specifically, the guidance client 114 may highlight or emphasize the individual in the image who is the LPQ such that the user need only position behind the indicated LPQ to join the queue. The guidance client 114 may also indicate the individuals in the queue (e.g., an empty box surrounding the individual) and utilize a special emphasis on the LPQ (e.g., a filled in box surrounding the LPQ).

In another exemplary embodiment, the guidance client 114 may provide more sophisticated instructions that may accompany the above described instruction, that may be provided independently, or that may be provided in combination with other types of instructions described below. In an exemplary embodiment, the guidance client 114 may list the instructions as a series of steps that are read by the user. In another exemplary embodiment, the guidance client 114 may generate audio outputs of the instructions. The audio outputs of the instructions may be provided at appropriate times such as when a particular instruction is to be performed. For example, while moving to join the queue, the guidance client 114 may receive further images captured in real time to determine an updated location of the user. The instructions may include directions and distances to be traveled based on the image and further images (e.g., turn right and go 100 feet along the queue). The distances may also be personalized. For example, the exemplary embodiments may utilize a user profile of the user that includes physical characteristics (e.g., stored locally on the smart device 110, stored remotely in a profile repository (not shown), etc.). Accordingly, the user profile may indicate an estimated distance traveled per step or stride taken by the user (e.g., 2 feet per step). In this manner, the directions may be personalized for the user (e.g., turn right and go 50 steps along the queue). Through the various distances and directions, the audio outputs may be played out at the appropriate times. In a further exemplary embodiment, the user interface may show the image of the queue and provide the instructions based on the image. As the user moves, the image may be shown in a modified manner such as re-centering the image to represent the user's current position relative to the line. Once the user has found the identified LPQ, the user may enter an input indicating that the user has joined the queue after the current LPQ to conclude the features of the exemplary embodiments.

In the exemplary embodiments, the queue server 130 may include an image analysis program 132 and a LPQ program 134, and act as a server in a client-server relationship with the guidance client 114. The queue server 130 may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of receiving and sending data to and from other computing devices. While the queue server 130 is shown as a single device, in other embodiments, the queue server 130 may be comprised of a cluster or plurality of computing devices, working together or working independently. While the queue server 130 is also shown as a separate component, in other embodiments, the operations and features of the queue server 130 may be incorporated with one or more of the other components of the queue guidance system 100. For example, the operations and features of the queue server 130 may be incorporated in the smart device 110. The queue server 130 is described in greater detail as a hardware implementation with reference to FIG. 3 (e.g., data processing according to the exemplary embodiments being performed by processor 02), as part of a cloud implementation with reference to FIG. 4 (e.g., the device 110 according to the exemplary embodiments being represented by the desktop computer 54B), and/or as utilizing functional abstraction layers for processing with reference to FIG. 5 (e.g., workload layer 90 including queue processing 96 according to the exemplary embodiments).

In the exemplary embodiments, the image analysis program 132 may be a software, hardware, and/or firmware application configured to receive an image as captured by a user utilized the imager of the smart device 110. The image analysis program 132 may perform initial processing operations on the image. For example, the image analysis program 132 may estimate three-dimensional positions and facing directions of all individuals currently in the queue. The image analysis program 132 may utilize any mechanism to determine the positions and facing directions of the individuals. For example, the image analysis program 132 may utilize facial detection operations to determine a front side of a head including the face of the individual and a back side of the head opposite the front side. It is noted that the facial detection operation may be performed in a generalized manner such as detecting eyes, a nose, a mouth, etc. which are features generally associated with a front side of a head. In this manner, the facial detection operation may maintain anonymity with regard to an identity of the individuals of the queue. In another example, the image analysis program 132 may utilize body detection operations to determine a front side of a body and a back side of a body (e.g., based on angles of limbs that only bend in a known direction). The body detection operation may utilize base models or other frameworks to determine the three dimensional positions of the individuals in the queue. In a substantially similar manner, the body detection operation may also maintain anonymity and utilize generalized features to determine a side of the body.

In the exemplary embodiments, the LPQ program 134 may be a software, hardware, and/or firmware application configured to utilize the information ascertained by the image analysis program 132 to perform further operations. The LPQ program 134 may perform the further operations to determine the LPQ for the specific queue associated with the image and the user as well as generate and provide instructions for the user to join the queue following normal social behavior. As will be described in detail below, the further operations of the LPQ program 134 may include constructing a vector field from the positions and facing directions of the individuals in the queue. The further operations of the LPQ program 134 may also include performing fixed point iterations starting from the positions of the individuals in the queue on a signed-inverse vector field. Through these further operations, the LPQ program 134 may identify the LPQ and generate the appropriate instructions for the user.

Figure 2:
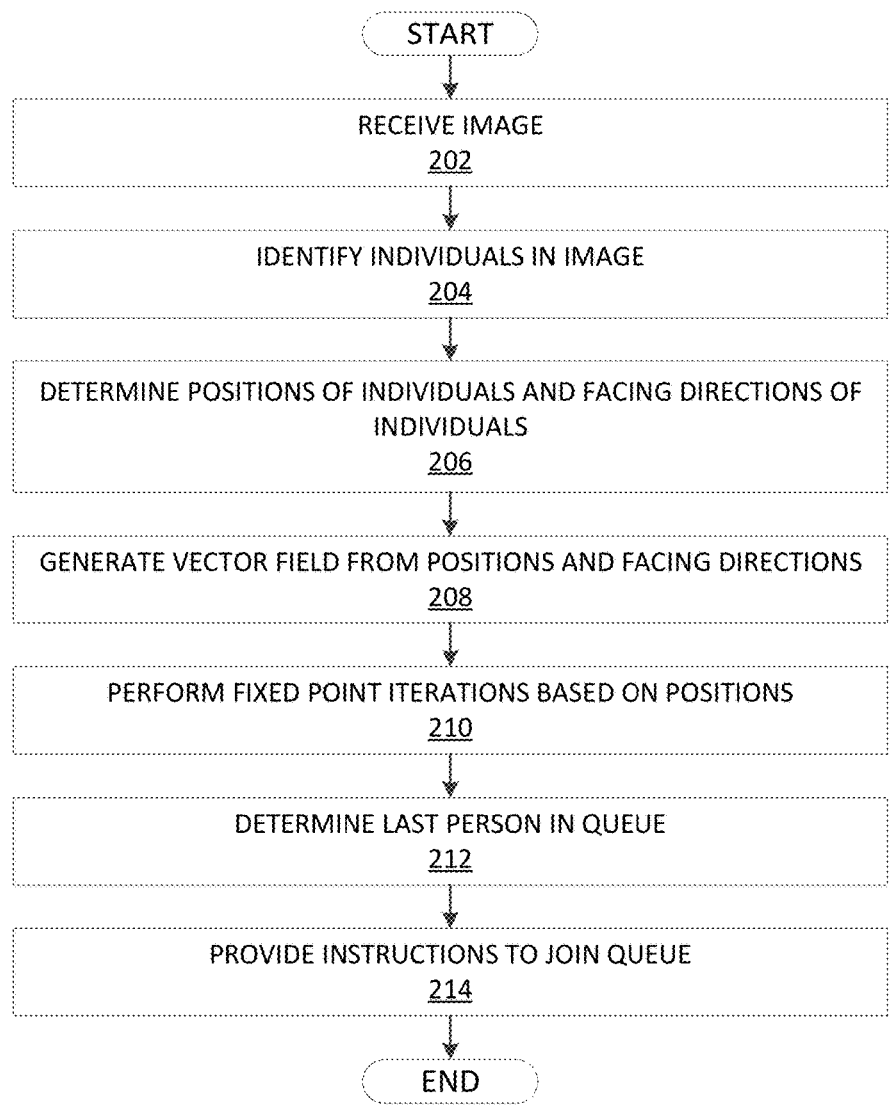
FIG. 2 depicts an exemplary flowchart of a method illustrating the operations of a queue server 130 of the queue guidance system 100 in identifying a last person of a queue and provide appropriate instruction to join the queue, in accordance with the exemplary embodiments.

FIG. 2 depicts an exemplary flowchart of a method 200 illustrating the operations of the queue server 130 of the queue guidance system 100 in identifying the LPQ and provide appropriate instruction to join the queue, in accordance with the exemplary embodiments. The method 200 may relate to operations that are performed by the image analysis program 132 and the LPQ program 134. The method 200 will be described from the perspective of the queue server 130.

The queue server 130 may receive an image from the smart device 110 (step 202). As described above, the user utilizing the smart device 110 may head toward a destination where a queue is present. The user may initiate the imager from among the sensors 112 to capture an image of the queue. In an exemplary embodiment, by initiating the guidance client 114, the guidance client 114 may instruct the user to capture an image of the queue. The user may position the imager such that a field of view of the imager captures the queue. The smart device 110 may transmit the image to the queue server 130 via the network 108.

The queue server 130 may process the image and identify individuals who are in the queue (step 204). The image analysis program 132 may identify the individuals of the queue. For example, the image analysis program 132 may assume that each individual in the queue has a head. Thus, each head that is found in the image may be indicative of a unique individual in the queue. The image analysis program 132 may utilize any technique to identify the individuals who are within the image. The image analysis program 132 may also utilize any technique to identify those individuals who are lined up in the queue. The image analysis program 132 may be configured to maintain anonymity and only process the image to identify generalized characteristics of individuals who are part of the queue.

In processing the image to identify individuals who are in the queue, the image analysis program 132 may be configured to perform an initial check of the received image. For example, the image analysis program 132 may determine whether the image is of a sufficient quality to perform the subsequent operations (e.g., the user may have moved creating a blurry image from which the subsequent operations may be performed with a low confidence). As a result of the image being unusable for purposes of the exemplary embodiments, the queue server 130 may request that the user provide a clearer image. In another example, the image analysis program 132 may determine whether there is a probability above an uncertainty threshold indicative of the entire queue not being present in the image. If it appears that the entire queue is not present in the image, the queue server 130 may prompt the user to verify whether the entire queue is captured in the image (e.g., the end of the image may indeed include the LPQ but the queue as depicted in the image may still appear to extend beyond the actual LPQ). As a result of the user verifying that the image includes the entire queue, the queue server 130 may proceed accordingly. As a result of the user verifying that the image only includes a portion of the queue, the queue server 130 may proceed through various prompts to the user. For example, the queue server 130 may request whether the user still wishes to continue utilizing the current image. If confirmed to continue, the queue server 130 may perform the subsequent operations based on the current image and determine the LPQ at least for the portion of the queue captured in the image. If the user indicates that a new image will be provided, the queue server 130 may receive the new image and proceed accordingly.

As a result of identifying the individuals of the queue as captured in the image, the queue server 130 may determine positions of the individuals in the queue and facing directions of the individuals in the image (step 206). For example, the image analysis program 132 may further process the image to determine the positions and facing directions. In determining the positions and facing directions, the image analysis program 132 may only determine a minimum number of generalized characteristics sufficient to determine the position and facing direction of each individual. In this manner, the identity of the individuals may remain anonymous throughout the entire process. As will be described in further detail below, the unsupervised mechanism according to the exemplary embodiments utilize the positions and facing directions as a basis to estimate a direction of the queue. The unsupervised mechanism according to the exemplary embodiments may then utilize the direction of the queue to determine the LPQ.

The image analysis program 132 may determine the positions as three-dimensional positions. The image analysis program 132 may determine the three-dimensional positions and facing directions of the individuals using any one or more techniques configured to provide such information. For example, the image analysis program 132 may detect an individual, may detect the queue in which the individual is a part, and may estimate a three-dimensional pose of the individual. In another example, the image analysis program 132 may detect an individual, may detect the queue in which the individual is a part, may determine a depth in the image of the individual and/or the queue, and may estimate a three-dimensional pose of the individual. In a further example, the image analysis program 132 may detect an individual, may detect the queue in which the individual is a part, may perform a light detection and ranging (LIDAR) on the individual and/or the queue, and estimate a facing direction of the individual. In each of these techniques, the image analysis program 132 may perform the corresponding technique for each individual in the image to determine the three-dimensional positions and facing directions of each individual in the queue that the user is interested in joining.

It is noted that the queue server determining the individuals (step 204) and determining the positions and facing directions of the individuals (step 206) being performed in separate steps is only for illustrative purposes. In another exemplary embodiment, these operations may be performed simultaneously or incorporating one into the other. For example, the individuals may be determined inherently through determining the positions and facing directions of the individuals. The method 200 may be performed in any manner such that the positions and facing directions of the individuals are determined.

The queue server may generate a vector field from the positions and the facing directions of the individuals of the queue (step 208). For example, the LPQ program 134 may perform the subsequent operations in determining the LPQ. When considering only the positions and the facing directions of the individuals in the image, a randomness factor may be introduced as lengthier queues including a greater number of people will not all exhibit the same facing direction. Accordingly, the LPQ program 134 may smooth out the facing directions of the individuals via the vector field. The vector field also enables iterative steps to be performed in determining the LPQ.

According to an exemplary embodiment, the vector field may be a function g that takes a three-dimensional position x and returns a three-dimensional direction pointing to the head of the queue. For a position of an individual $p_i$, where i may run from 1 to n, n being the number of individuals identified in the image, the LPQ program 134 generates a vector field for each $p_i$ around itself with the same direction as the facing direction. Subsequently, by following the negative vector field, the LPQ program 134 may arrive at the LPQ of the queue.

In an exemplary sequence, the LPQ program 134 may define an individual i whose position is represented as position $p_i$ and facing direction $f_i$. The LPQ program 134 may filter the facing direction $f_i$ of an individual i to a filtered facing direction $\bar{f}_i$, of the individual i (e.g., $f_i \rightarrow \bar{f}_i$). According to the exemplary embodiments, the LPQ program 134 may filter the facing direction $f_i$ because the facing direction $f_i$ may not be accurate. Therefore, the LPQ program 134 may filter the facing direction $f_i$ by finding likely straight lines that represent straight queues and rotate the straight lines to follow the queue. In an exemplary sequence of the filtering operation, the LPQ program 134 may initialize $\bar{f}_i=0$ for all individuals i. The LPQ program 134 may normalize all $f_i$ to be unit norm vectors. The LPQ program 134 may then loop for a fixed number of iterations. In the looping operation, the LPQ program 134 may randomly select two points from among the positions of the individuals $p_i$ and fit a line l through the selected points. Using the line l, the LPQ program 134 may determine the L2 distances between each individual position $p_i$ and its closest point on the line l where the distance is denoted as $d_i$. The LPQ program 134 may project the facing direction $f_i$ on the line l to get a three-dimensional direction where the three-dimensional direction is denoted as $\hat{f}_i$. The LPQ program 134 may compute an affinity score $s_i$ from the distance $d_i$ (e.g., using a Gaussian kernel). For example, the score $s_i$ may be determined as $$s_i = \exp\left(-\frac{d_i^2}{2\delta^2}\right),$$

where $\delta$ is an adjustable parameter. The LPQ program 134 may determine a weight w of this line l using $w=-2+\Sigma_{i=1}^{n} s_i$. In completing the filtering operation, the LPQ program 134 may accumulate the filtered facing directions with the following: $\bar{f}_i:=\bar{f}_i+w\hat{f}_i$. Further details are provided below with regard to vector field g after the facing directions $f_i$ have been filtered.

Given a three-dimensional position x, the LPQ program 134 may compute the vector field at x as a weighted sum of $\bar{f}_i$ where the weight of each individual i is an affinity between three-dimensional position x and all the positions $p_i$ (e.g., using Gaussian kernel, Mahalanobis kernel, etc.).

In addition to the above described weight sum, the LPQ program 134 may be further configured to add additional influences. For example, the LPQ program 134 may make the vector field due to each individual i pointing away from a line defined by $p_i+\bar{f}_i$. This may allow the iteration in a subsequent operation to move toward the principle line of the kernel rather than just parallel to it.

The queue server 130 may perform fixed point iterations starting from all three-dimensional positions on the signed-inverse vector field (step 210). For example, the LPQ program 134 may perform the subsequent operations of the fixed point iterations. In performing the fixed point iterations, the LPQ program 134 may determine the position of the queue end occupied by a current LPQ. In representing the vector field previously determined to be denoted as f, the LPQ program 134 may set $p_i^0=p_i$. Then for all individuals i and for an iteration t, the LPQ program 134 may iterate the following $p_i^{t+1}=p_i^t-f(p_i^t)$ until a termination criteria has been reached (e.g., a confidence value meeting a confidence threshold that the LPQ has been identified for the queue that the user is interested in joining).

Using the above determined information, the queue server 130 may determine or identify the LPQ (step 212). For example, the LPQ program 134 may perform yet another subsequent operation to identify the LPQ. The LPQ program 134 may define the final position of individual i from the above described operations and denote the final position as $\bar{p}_i$. The LPQ program 134 may determine the individual $p_k$ being the closest to the most $\bar{p}_i$. The LPQ program 134 identify the individual k as the LPQ.

As a result of identifying the LPQ, the queue server 130 may provide instructions to the user to join the queue (step 214). As described above, the queue server 130 may provide the instructions in a variety of manners. For example, the queue server 130 may mark the image of the queue such that the LPQ is emphasized (e.g., a filled in box surrounding the LPQ) and additionally, the other individuals are indicated (e.g., an empty box surrounding each non-LPQ individual in the queue). In another example, the queue server 130 may provide more sophisticated instructions such as listed instructions, auditory instructions, modified and/or personalized instructions, etc.

To further illustrate the operations of the queue server 130, reference is now made to an illustrative exemplary process that includes additional operations that may be incorporated. According to the illustrative exemplary process, a user may wish to go to a destination such as a dining establishment. The dining establishment may not take reservations and operate on a first come, first serve basis. The dining establishment may also be quite popular such that relatively long queues form outside the dining establishment. Upon arriving at the dining establishment, there is indeed a queue that has formed. The user may initiate the guidance client 114 to capture an image of the queue to determine how to join the queue by following social norms. The image may be transmitted to the queue server 130 that processes the image. As described above, the queue server 130 may determine the three-dimensional positions and the facing directions of each individual identified to be part of the queue of interest (e.g., as the image may include queues of neighboring establishments). The queue server 130 may perform various operations such as determining a vector field indicating a three-dimensional direction toward the front of the queue, performing a filtering operation of the facing directions to improve accuracy of the facing directions, and fixed point iterations to determine an end of the queue. The queue server 130 may also determine the individual occupying a position coinciding with the end of the queue. The queue server 130 may mark the image to highlight the individual who is identified as the LPQ. The image may be shown to the user via the guidance client 114. Upon seeing the marked image, the user may proceed to join the queue behind the current LPQ, thereby becoming the new LPQ.

As noted above, after filtering the facing directions $f_i$, the LPQ program 134 may evaluate the vector field g at position x. According to an exemplary implementation, the LPQ program 134 may initially normalize all $\bar{f}_i$, to be unit norm vectors. The LPQ program 134 may evaluate the vector field g as $g\ (x;\{(p_i,\bar{f}_i)\}_{i=1}^{n}) = h(\Sigma_{i=1}^{n} w_i(\bar{f}_i + \lambda(I - \bar{f}_i\bar{f}_i^T)(x-p_i)))$, where $\lambda$ is an adjustable parameter, $$w_i = \exp\left(-\frac{1}{2}(x-p_i)^T A_i^{-1}(x-p_i)\right),$$

$A_i = Q_i \Lambda Q_i^T$, $Q_i$ is an orthogonal matrix with $\bar{f}_i$ as the first column, and $\Lambda$ is a diagonal matrix containing adjustable parameters, where the first diagonal value may have a lower value than the other two. The variable h is a function that attenuates its input vector such as $$h(x) = \max(0, \|x\| - \mu)\left(\frac{x}{\|x\|}\right),$$

where $\mu$ is an adjustable parameter. The weight $w_i$ may control the weight of how much each $p_i$ affects x where the farther apart, the lower weight and effect. The term $\lambda(I - \bar{f}_i\bar{f}_i^T)(x-p_i)$ encourages the vector field to point away from the principal line of the gaussian kernel, which encourages the iterator $p_i^t$ to move toward the principle line of the kernel.

The exemplary embodiments are configured to identify a last person of a queue such that a user wishing to join the queue is alerted to the last person of the queue and join the queue following social norms. Based on an image captured of the queue, the exemplary embodiments may identify the individuals who are part of the queue, determine positions and facing directions of the individuals of the queue, construct a vector field from the positions and facing directions, and perform fixed point iterations until a confidence that the end of the queue has been determined reaches a confidence threshold. In determining the end of the queue, the exemplary embodiments may identify the individual who is occupying the space corresponding to the end of the queue. The identified individual may therefore be designated as the last person of the queue. The exemplary embodiments may thereby provide instructions to the user as to the whereabouts of the last person of the queue for proper joining of the queue.

As described above, the exemplary embodiments provide an unsupervised algorithm to identify the LPQ from first-person RGB images. Accordingly, the exemplary embodiments are configured to determine the LPQ in an ad hoc manner without any training data to formulate a baseline from which the LPQ may be determined. In this manner, the exemplary embodiments require fewer constraints than conventional approaches such as eliminating the need for training data, enabling the imager to be movable and not be in a fixed position, eliminate a requirement for a point of interest in an image that may be indicative of a front of the queue, and may only utilize a single image rather than requiring a sequence of images or a video. The features of the exemplary embodiments may be implemented in social-based navigation applications where sight-impaired users, robots, autonomous vehicles, etc. may be properly navigated to join queues. The features of the exemplary embodiments may also be implemented in infrastructure management such that queues may be managed in department stores, bus terminals, train stations, airports, etc.

Figure 3:
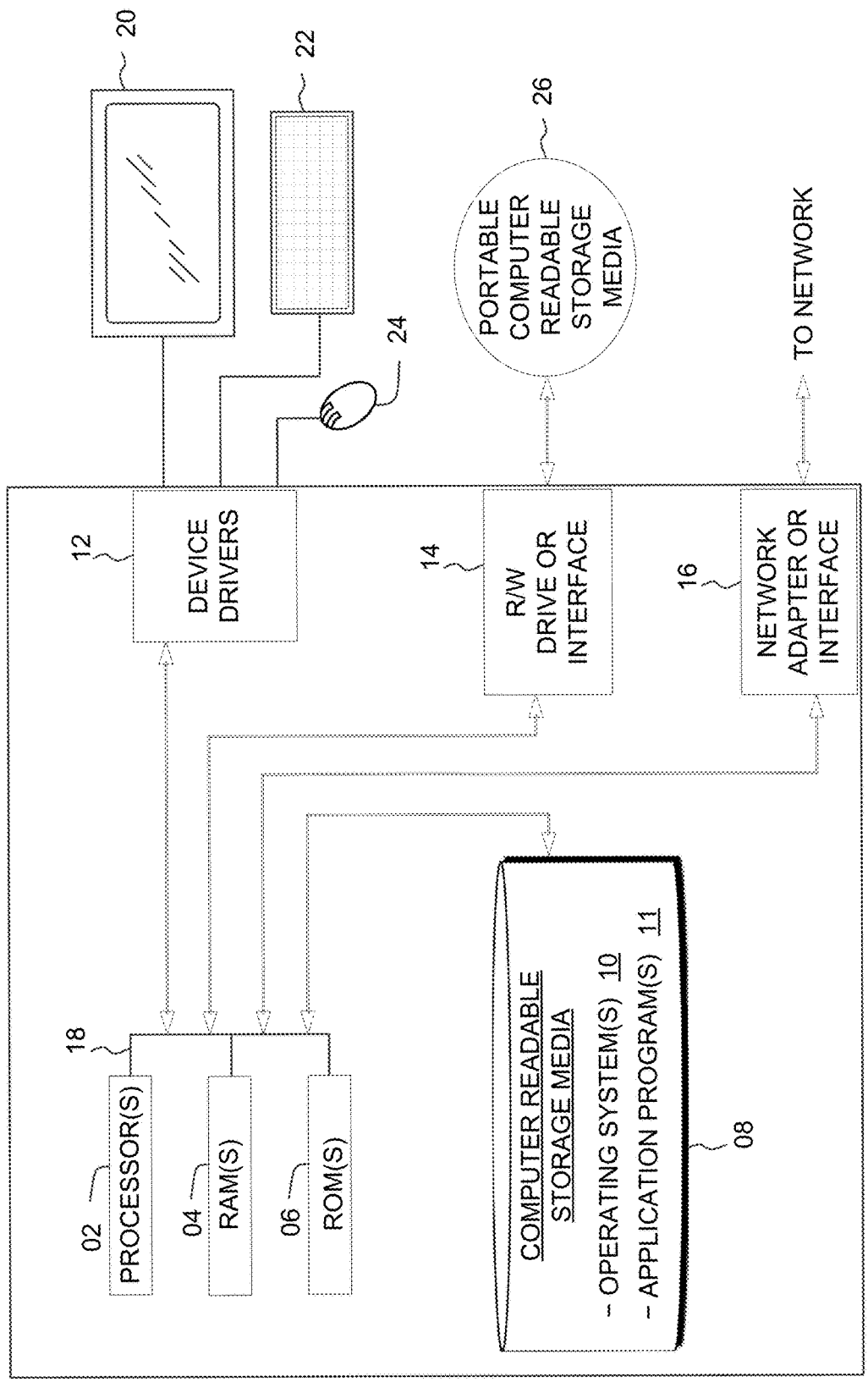
FIG. 3 depicts an exemplary block diagram depicting the hardware components of the queue guidance system 100 of FIG. 1, in accordance with the exemplary embodiments.

FIG. 3 depicts a block diagram of devices within the queue guidance system 100 of FIG. 1, in accordance with the exemplary embodiments. It should be appreciated that FIG. 3 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, RAY drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
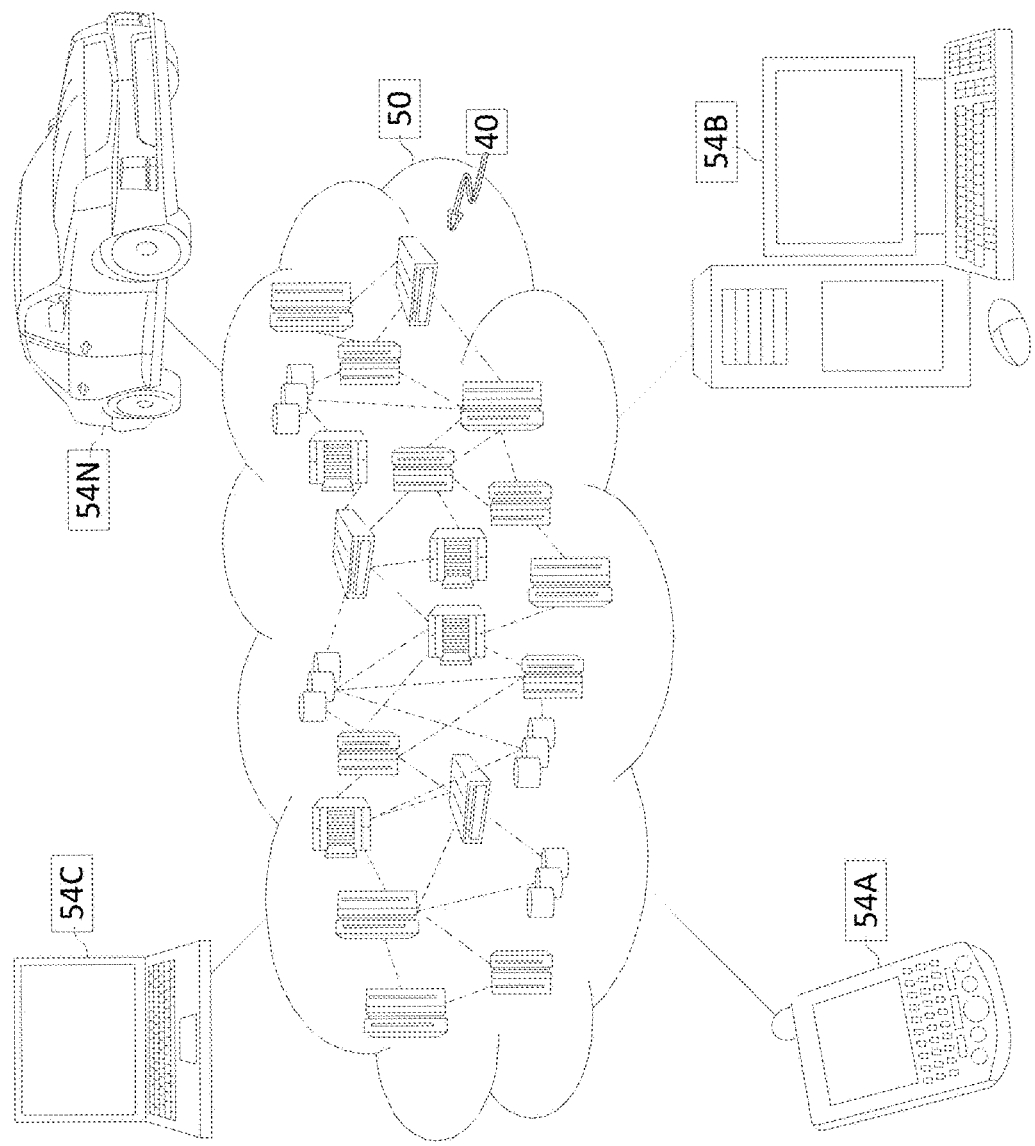
FIG. 4 depicts a cloud computing environment, in accordance with the exemplary embodiments.

Referring now to FIG. 4, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 40 and cloud computing environment 50 can communicate with any type of computerized device over any type of network and/or network addressable connection (e.g., using a web browser).

Figure 5:
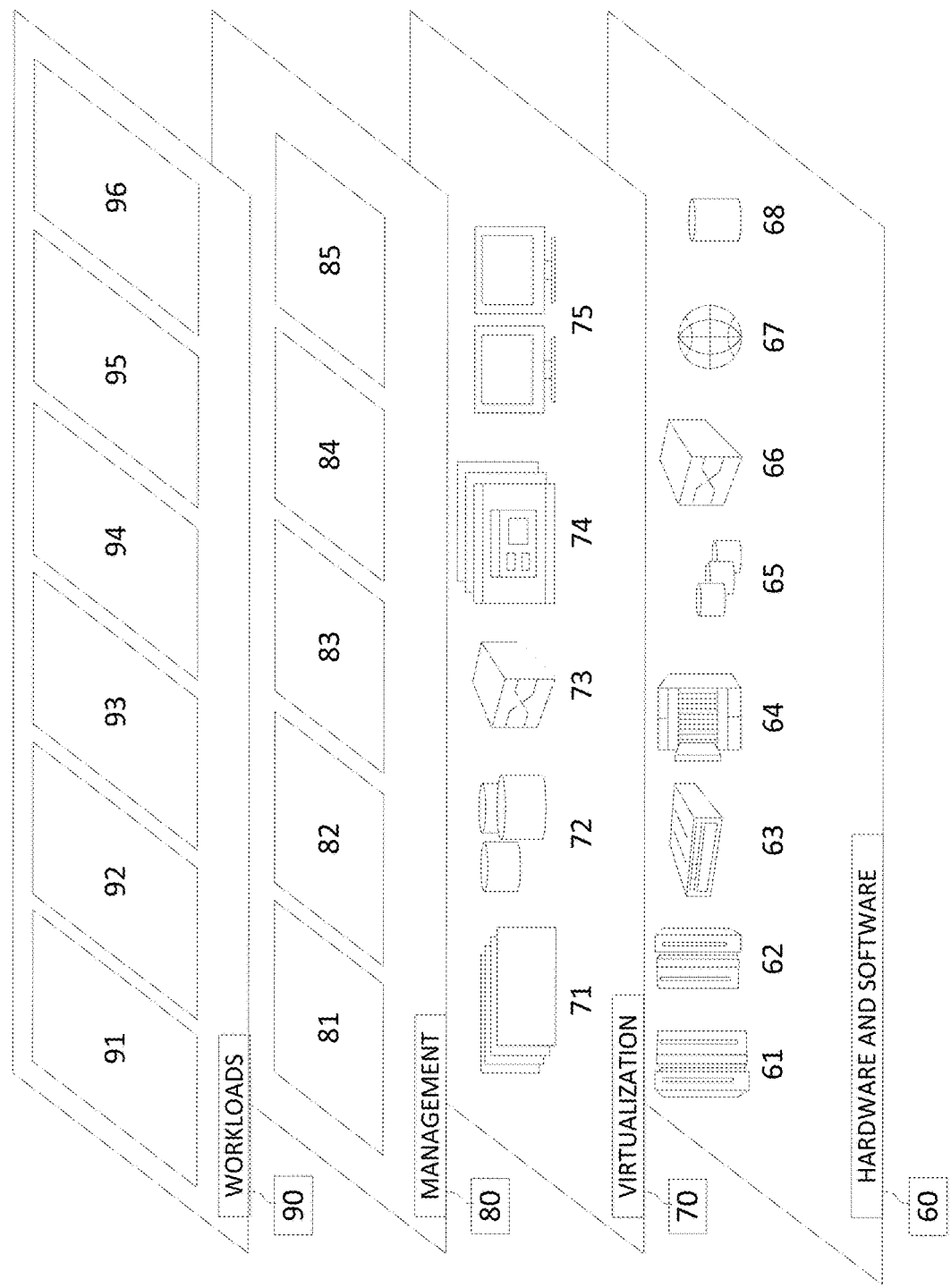
FIG. 5 depicts abstraction model layers, in accordance with the exemplary embodiments.

Referring now to FIG. 5, a set of functional abstraction layers provided by cloud computing environment 50 (FIG. 4) is shown. It should be understood in advance that the components, layers, and functions shown in FIG. 5 are intended to be illustrative only and the exemplary embodiments are not limited thereto. As depicted, the following layers and corresponding functions are provided:

Hardware and software layer 60 include hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and queue processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for identifying a last person of a queue, the method comprising:
   receiving an image of the queue, the image including a plurality of individuals comprising the queue;
   determining positions and facing directions of the individuals comprising the queue; identifying the last person of the queue based on a vector field analysis according to the positions and the facing directions of the individuals comprising the queue, wherein the vector field analysis utilizes a negative vector field of the vector field, the negative vector field being indicative of an end of the queue, and wherein one of the individuals occupying a space coinciding with the end of the queue is identified as the last person of the queue, and wherein the vector field analysis includes fixed point iterations of the vector field until a confidence that the last person of the queue has been identified has reached a confidence threshold; and
   generating instructions to join the queue based on the identified last person of the queue, the instructions being a modified image indicating the last person of the queue in the image.

2. The computer-implemented method of claim 1, wherein determining the positions and the facing directions is based on detecting each of the individuals, the queue in which each of the individuals is a part, and a three-dimensional pose estimation.

3. The computer-implemented method of claim 1, wherein the vector field analysis is based on a vector field utilizing a function that takes a three-dimensional position and returns a three-dimensional direction indicative of a head of the queue.

4. The computer-implemented method of claim 1, wherein the vector field analysis includes filtering the facing directions to find straight lines of the facing directions pointing toward a head of the queue.

5. The computer-implemented method of claim 1, wherein the image is captured with a first-person perspective.

6. A computer program product for identifying a last person of a queue, the computer program product comprising:
   one or more non-transitory computer-readable storage media and program instructions stored on the one or more non-transitory computer-readable storage media the program instructions executable by a processing unit to cause the processing unit to perform a method comprising:
   receiving an image of the queue, the image including a plurality of individuals comprising the queue;
   determining positions and facing directions of the individuals comprising the queue; identifying the last person of the queue based on a vector field analysis according to the positions and the facing directions of the individuals comprising the queue, wherein the vector field analysis utilizes a negative vector field of the vector field, the negative vector field being indicative of an end of the queue, and wherein one of the individuals occupying a space coinciding with the end of the queue is identified as the last person of the queue, and wherein the vector field analysis includes fixed point iterations of the vector field until a confidence that the last person of the queue has been identified has reached a confidence threshold; and generating instructions to join the queue based on the identified last person of the queue, the instructions being a modified image indicating the last person of the queue in the image.

7. The computer program product of claim 6, wherein determining the positions and the facing directions is based on detecting each of the individuals, the queue in which each of the individuals is a part, and a three-dimensional pose estimation.

8. The computer program product of claim 6, wherein the vector field analysis is based on a vector field utilizing a function that takes a three-dimensional position and returns a three-dimensional direction indicative of a head of the queue.

9. The computer program product of claim 6, wherein the vector field analysis includes filtering the facing directions to find straight lines of the facing directions pointing toward a head of the queue.

10. The computer program product of claim 6, wherein the image is captured with a first-person perspective.

11. A computer system for identifying a last person of a queue, the computer system comprising:

one or more computer processors, a memory coupled to at least one of the processors, one or more computer-readable storage media, and program instructions stored on the one or more of the computer-readable storage media and executed by at least one of the one or more processors to perform the actions of:

receiving an image of the queue, the image including a plurality of individuals comprising the queue;

determining positions and facing directions of the individuals comprising the queue; identifying the last person of the queue based on a vector field;

analysis according to the positions and the facing directions of the individuals comprising the queue, wherein the vector field analysis utilizes a negative vector field of the vector field, the negative vector field being indicative of an end of the queue, and wherein one of the individuals occupying a space coinciding with the end of the queue is identified as the last person of the queue, and wherein the vector field analysis includes fixed point iterations of the vector field until a confidence that the last person of the queue has been identified has reached a confidence threshold; and generating instructions to join the queue based on the identified last person of the queue, the instructions being a modified image indicating the last person of the queue in the image.

12. The computer system of claim 11, wherein determining the positions and the facing directions is based on detecting each of the individuals, the queue in which each of the individuals is a part, and a three-dimensional pose estimation.

13. The computer system of claim 11, wherein the vector field analysis is based on a vector field utilizing a function that takes a three-dimensional position and returns a three-dimensional direction indicative of a head of the queue.

14. The computer system of claim 11, wherein the vector field analysis includes filtering the facing directions to find straight lines of the facing directions pointing toward a head of the queue.

* * * * *